US006488091B1

(12) United States Patent
Weaver et al.

(10) Patent No.: US 6,488,091 B1
(45) Date of Patent: Dec. 3, 2002

(54) SUBTERRANEAN FORMATION TREATING FLUID CONCENTRATES, TREATING FLUIDS AND METHODS

(75) Inventors: Jim D. Weaver, Duncan, OK (US); Steve F. Wilson, Loco, OK (US); Bobby K. Bowles, Comanche, OK (US); Billy F. Slabaugh, Marlow, OK (US); Mark A. Parker, Duncan, OK (US); David M. Barrick, Duncan, OK (US); Stanley J. Heath, Duncan, OK (US); Harold G. Walters, Duncan, OK (US); R. Clay Cole, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 37 days.

(21) Appl. No.: 09/879,634

(22) Filed: Jun. 11, 2001

(51) Int. Cl.$^7$ .................. E21B 43/26; E21B 43/267
(52) U.S. Cl. .............. 166/300; 166/305.1; 166/308; 507/215; 507/216; 507/217; 507/255; 507/267; 507/276; 507/277; 507/903; 507/904; 507/922
(58) Field of Search .................. 166/280, 294, 166/295, 300, 305.1, 308; 175/72; 507/215, 216, 217, 255, 267, 276, 277, 903, 904, 922

(56) References Cited

U.S. PATENT DOCUMENTS

| | | | |
|---|---|---|---|
| 2,782,190 A | * 2/1957 | Fisher et al. ............... 507/110 |
| 3,728,331 A | 4/1973 | Savage | |
| 3,794,115 A | * 2/1974 | Skagerberg ................. 166/294 |
| 4,568,481 A | * 2/1986 | Harris, Jr. ................. 166/308 |
| 4,753,659 A | 6/1988 | Bayerlein et al. | |
| 4,766,959 A | * 8/1988 | Allison .................... 507/217 |
| 4,828,726 A | 5/1989 | Himes et al. | |
| 4,874,854 A | 10/1989 | Colegrove et al. | |
| 4,974,678 A | 12/1990 | Himes et al. | |
| 4,977,962 A | 12/1990 | Himes et al. | |
| 5,097,904 A | 3/1992 | Himes | |
| 5,184,680 A | * 2/1993 | Totten et al. ............... 106/730 |
| 5,197,544 A | 3/1993 | Himes | |
| 5,305,832 A | * 4/1994 | Gupta et al. ............... 166/300 |
| 5,330,005 A | 7/1994 | Card et al. | |
| 5,439,055 A | 8/1995 | Card et al. | |
| 5,501,275 A | 3/1996 | Card et al. | |
| 5,697,444 A | * 12/1997 | Moorhouse et al. ........ 166/308 |
| 5,708,162 A | 1/1998 | Hilbig et al. | |
| 5,720,347 A | * 2/1998 | Audibert et al. ............ 166/294 |
| 5,775,425 A | 7/1998 | Weaver et al. | |
| 5,787,986 A | 8/1998 | Weaver et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,871,049 A | 2/1999 | Weaver et al. | |
| 6,047,772 A | 4/2000 | Weaver et al. | |

FOREIGN PATENT DOCUMENTS

EP 0 030 443 A1 6/1981
WO WO 93/15116 8/1993

OTHER PUBLICATIONS

Craig, David, et al. (1992) Proceedings Of The Thirty–Ninth Annual Southwestern Petroleum Short Course, Southwestern Petroleum Short Course Association, Inc., Apr. 22–23, 1992, Texas Tech University, Lubbock,.
Frollini, E. et al., (1995) Carbohydrate Polymers 27:129–135;.
Vijayendran and Bone, (1994) Carbohydrate Polymers 4:299–313.
Ouchi, T., et al., (1997) J.M.S.—Pure Appl. Chem. A34(6):975–989;.
Tayal, A., et al., (2000) Macromolecules 33:9488–9484.

* cited by examiner

*Primary Examiner*—George Suchfield
(74) *Attorney, Agent, or Firm*—Robert A. Kent; Clark Dougherty

(57) ABSTRACT

Subterranean formation treating fluid concentrates, treating fluids and methods are provided by the present invention. The treating fluid concentrates are basically comprised of water and a substantially fully hydrated depolymerized polymer. The treating fluids which are formed by adding water to the treating fluid concentrates are basically comprised of water, a substantially fully hydrated depolymerized polymer and a crosslinking agent for crosslinking the hydrated depolymerized polymer.

54 Claims, No Drawings

SUBTERRANEAN FORMATION TREATING FLUID CONCENTRATES, TREATING FLUIDS AND METHODS

BACKGROUND OF THE INVENTION

1. Field of the Invention

The present invention relates to methods and compositions for treating subterranean well formations, and more specifically, to improved subterranean formation treating fluid concentrates, treating fluids and methods of using the treating fluids.

2. Description of the Prior Art

Producing subterranean formations penetrated by well bores are often treated to increase the permeabilities or conductivities thereof. One such production stimulation treatment involves fracturing the formation utilizing a viscous treating fluid. That is, the subterranean formation or producing zone therein is hydraulically fractured whereby one or more cracks or "fractures" are produced therein. Fracturing may be carried out in wells that are completed in subterranean formations for virtually any purpose. The usual candidates for fracturing or other stimulation procedures are production wells completed in oil and/or gas containing formations. However, injection wells used in secondary or tertiary recovery operations for the injection of fluids may also be fractured in order to facilitate the injection of the fluids.

Hydraulic fracturing is accomplished by injecting a viscous fracturing fluid into a subterranean formation or zone at a rate and pressure sufficient to cause the formation or zone to break down with the attendant production of one or more fractures. As the fracture is created a portion of the fluid contained in the viscous fracturing fluid leaks off into the permeable formation and a filter cake comprised of deposited gelling agent is built up upon the walls of the fracture which then helps to prevent or reduce further fluid loss from the fracturing fluid to the formation. The continued pumping of the viscous fracturing fluid extends the fractures and a proppant such as sand or other particulate material may be suspended in the fracturing fluid and introduced into the created fractures. The proppant material functions to prevent the formed fractures from closing upon reduction of the hydraulic pressure which was applied to create the fracture in the formation or zone whereby conductive channels remain through which produced fluids can readily flow to the well bore upon completion of the fracturing treatment.

The fracturing fluid must have a sufficiently high viscosity to retain the proppant material in suspension as the fracturing fluid flows into the created fractures. A viscosifier has heretofore often been utilized to gel a base fluid whereby a fracturing fluid having the high viscosity needed to realize the maximum benefits from the fracturing process is provided. After the high viscosity fracturing fluid has been pumped into the formation and fracturing of the formation has occurred, the fracturing fluid generally has been caused to revert into a low viscosity fluid for removal from the formation by breaking the gel. The breaking of viscosified fracturing fluids has commonly been accomplished by adding a breaker to the fracturing fluid prior to pumping it into the subterranean formation.

The fracturing fluids utilized heretofore have predominantly been water based liquids containing a gelling agent comprised of a polysaccharide such as guar gum. Guar and derivatized guar polymers such as hydroxypropylguar are economical water soluble polymers which can be used to create high viscosity in an aqueous fluid and are readily crosslinked which further increases the viscosity of the fluid. While the use of gelled and crosslinked polysaccharide fracturing fluids has been highly successful, the fracturing fluids have not been thermally stable at temperatures above about 200° F. That is, the highly viscous gelled and crosslinked fluids lose viscosity with time at high temperatures. To offset the loss of viscosity, the concentration of the gelling agent has been increased which involves increased cost and causes increased friction pressure in the tubing through which the fluid is injected into a subterranean formation which makes pumping of the fracturing fluids more difficult. Thermal stabilizers such as sodium thiosulfate have been included in the fracturing fluids to scavenge oxygen and thereby increase the stabilities of the fracturing fluids at high temperatures. However, the use of thermal stabilizers also increases the cost of the fracturing fluids.

Another problem which has been experienced in the use of gelled and crosslinked polysaccharide fracturing fluids involves the breaking of such fracturing fluids after fractures have been formed. Breakers such as oxidizers, enzymes and acid release agents that attack the acetal linkages in the polysaccharide polymer backbone have been used successfully.

In order to make the heretofore used gelled and crosslinked polysaccharide fracturing fluids carry sufficient proppant, the concentration of the crosslinking agent utilized has often had to be increased which in turn increases the cost and viscosity of the fracturing fluid. The water based fracturing fluids including gelled and crosslinked polysaccharide gelling agents have had significantly reduced fluid loss as compared to other fracturing fluids which reduces or eliminates the need for costly fluid loss additives. However, because the gelled and crosslinked polysaccharides have had high molecular weights, the filter cake produced from the viscous fracturing fluid on the walls of well bores penetrating producing formations and in fractures formed therein is often very difficult to remove.

Another problem experienced in the use of a water based fracturing fluid including a gelled and crosslinked polysaccharide gelling agent is that it must be mixed in holding tanks for a considerable length of time for hydration of the gelling agent to occur. During the fracturing process carried out in a well, the hydrated fracturing fluid generally is pumped out of the holding tanks, mixed with proppant and other additives on the fly and pumped down the well bore to the formation being fractured. If during the job, the down hole pressure profile and other parameters that are obtained in real time indicate that a change in the fracturing fluid properties is required, that is, a change in the fracturing fluid viscosity to prevent a screen out of the fracture or the like, it is generally impossible to do so since it takes a very long time for a change to be made and for the changed fracturing fluid to reach the formation being fractured. Another problem related to pumping the fracturing fluid from holding tanks and combining the proppant material, crosslinker and other additives used on the fly is that the procedure requires the use of expensive metering and other similar equipment.

Finally, in many environmentally sensitive areas, the water based fracturing fluids containing polysaccharide gelling agents must be recovered from the well and disposed of by environmentally appropriate means which increases the overall cost of the fracturing treatment.

Thus, there are needs for improved subterranean formation treating fluids and methods whereby the fluids are not thermally unstable, do not produce insoluble residues, have high proppant carrying capacities, produce easily removed filter cake, do not have to be hydrated in holding tanks for long periods of time, can have their properties changed during use and can be recovered and reused if desired.

SUMMARY OF THE INVENTION

The present invention provides subterranean formation treating fluid concentrates, improved treating fluids which can be utilized for fracturing as well as various other subterranean formation treatments and methods of using the treating fluids which meet the needs described above and overcome the deficiencies of the prior art.

A subterranean formation treating fluid concentrate of this invention is basically comprised of water and a depolymerized substantially fully hydrated polymer. The treating fluid concentrate can also include a variety of additives required to be in treating fluids produced utilizing the concentrate such as pH adjusting compounds for adjusting the pH of the treating fluid formed with the concentrate, buffers, dispersants, surfactants for preventing the formation of emulsions between the treating fluid formed with the concentrate and subterranean formation fluids, bactericides and the like.

The treating fluid concentrate is prepared at a location away from the site of a well to be treated and transported to the well site prior to use. The concentrate is substantially fully hydrated and can be stored for long periods of time prior to its use. When used, the concentrate is continuously mixed with water and any additional additives required and pumped into the subterranean formation to be treated by way of the well bore penetrating it. Because there is very little time delay involved in mixing the treating fluid concentrate with additional water and other additives and pumping the treating fluid formed into a subterranean formation, the properties of the treating fluid can be periodically or continuously changed during the time that the pumping of the treating fluid takes place.

The improved subterranean formation treating fluids of this invention are basically comprised of water, a substantially fully hydrated depolymerized polymer, a pH adjusting compound for adjusting the pH of the treating fluid to an optimum level for crosslinking and a crosslinking agent for crosslinking the substantially fully hydrated depolymerized polymer. While the improved subterranean formation treating fluids of this invention can be utilized for carrying out a variety of subterranean well treatments such as fracturing subterranean formations, forming gravel packs in subterranean formations, forming temporary blocking in the well bore, and as completion fluids and drill-in fluids, they are particularly useful as fracturing fluids for producing one or more fractures in a subterranean formation. When utilized as a fracturing fluid, the treating fluid generally contains a crosslinking agent and a proppant material which are mixed with the treating fluid when it is formed by mixing the treating fluid concentrate described above with additional water. The substantially fully hydrated depolymerized polymer utilized in the concentrate and the treating fluid produced therefrom is preferably a depolymerized polysaccharide polymer, and most preferably depolymerized hydroxypropylguar.

The improved methods of treating a subterranean formation penetrated by a well bore are basically comprised of the following steps. A gelled and crosslinked treating fluid is prepared comprised of water, a substantially fully hydrated depolymerized polymer, a pH adjusting compound for adjusting the pH of the treating fluid to an optimum pH for crosslinking and a crosslinking agent for crosslinking the substantially fully hydrated depolymerized polymer. Thereafter, the gelled and crosslinked treating fluid is introduced into the subterranean formation to be treated.

Another improved method of treating a subterranean formation penetrated by a well bore whereby one or more fractures are formed therein basically comprises the following steps. A gelled and crosslinked fracturing fluid is prepared comprised of water, a substantially fully hydrated depolymerized polymer, a pH adjusting compound for adjusting the pH of the fracturing fluid and a crosslinking agent for crosslinking the substantially fully hydrated depolymerized polymer. Thereafter, the subterranean formation is contacted with the gelled and crosslinked fracturing fluid under conditions effective to create at least one fracture in the subterranean formation. After a fracture is created in the formation, a proppant material may be admixed with a portion of the fracturing fluid and introduced into the created fracture to ultimately prop the created fracture in an open position after the completion of the fracturing treatment.

It is, therefore, a general object of the present invention to provide improved subterranean formation treating fluid concentrates, treating fluids and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, the present invention provides an improved subterranean formation treating fluid which is prepared on the job site in a very rapid manner from a substantially fully hydrated subterranean formation treating fluid concentrate. The treating fluid concentrate is produced at an off-site manufacturing location and can be stored for long periods of time prior to or after being transported to the job site. The improved subterranean formation treating fluid is prepared at the job site by simply mixing the substantially fully hydrated treating fluid concentrate with additional water and any required additives not already contained in the concentrate. The preparation of the treating fluid involves the steps of metering the treating fluid concentrate into a blender wherein it is mixed with the additional water and additives which also may be metered into the blender or otherwise added to the fluid. The mixture then is substantially simultaneously pumped out of the blender and into the subterranean formation to be treated by way of a well bore penetrating it. From when the metering, mixing and pumping process starts to when the formed treating fluid reaches the subterranean formation to be treated involves a time period of only a few minutes which allows changes in the properties of the treating fluid to be made on the surface as required during the time the treating fluid is being pumped. For example, in a fracturing procedure carried out in a subterranean formation to stimulate production from the subterranean formation, changes can be made to the fracturing fluid during the pumping of the fluid in response to continuously monitored down hole parameters to achieve desired fracturing results, that is, the viscosity of the fracturing fluid, the amount of proppant material carried by the fracturing fluid and other properties of the fracturing fluid can be continuously measured on the surface and changed as required to achieve optimum down hole treatment results in real time.

The subterranean formation treating fluid concentrate of this invention is basically comprised of water and a substantially fully hydrated depolymerized polymer.

The substantially fully hydrated depolymerized polymer may be manufactured by various means. The polymer may be manufactured by forming a hydratable polymer having a relatively high molecular weight as a result of derivatization of a polysaccharide and then subjecting it to extensive depolymerization whereby the polymer backbone is divided into short chain polymer segments. The manufacture of such polymers can be made by derivatization and depolymerization techniques known in the art or as described in Provisional U.S. Application No. 60/297,345, entitled "Galactomannan Compositions and Methods for Making and Using the Same," filed Jun. 11, 2001 (Jesse Magallanes, Sylvain Diguet, William Stivers)(hereinafter referred to as the Magallanes application). According to one embodiment of the invention, the depolymerized polymer of the present invention may be prepared by adding the polymer to be depolymerized to a reactor vessel together with a quantity of hydrogen peroxide and water. In a preferred embodiment, the depolymerized galactomannan polymer is prepared by the methods described in the Magallanes application, the entire disclosure of which is incorporated herein by reference. The reactor vessel may be heated to an elevated temperature such as about 100° F. to initiate the reaction if the ambient temperature is insufficient to initiate the reaction. Once initiated, the depolymerization reaction is exothermic and the temperature of the reactor vessel generally should be maintained in the range of from about 100–200° F. for a sufficient time for the polymer to degrade to the desired molecular weight. Alternatively, the polymer may be formed from lower molecular weight monomers that are polymerized until the desired molecular weight is achieved. The hydratable polymer utilized for forming the short chain segments can be substantially any polysaccharide and is preferably a guar derivative polymer selected from the group consisting of hydroxypropylguar, carboxymethylhydroxypropylguar, carboxymethylguar, hydroxyethyl cellulose, hydroxyethyl cellulose grafted with glycidol or vinyl phosphonic acid, carboxymethyl cellulose, carboxymethylhydroxyethyl cellulose and the like. Of these, depolymerized hydroxypropylguar is preferred. The depolymerized polymer should have an average molecular weight in the range of from about 25,000 to about 400,000 and preferably has an average molecular weight in the range of from about 100,000 to about 250,000. The depolymerized polymer preferably should have a polydispersity ratio of from 1 to about 12 as determined by gel permeation chromatography as disclosed in "Practical High Performance Liquid Chromatography" edited by C. F. Simpson (Hyden & Son Ltd., 1976). The polydispersity ratio of polysaccharides or other polymers generally can range from about 2 to as much as 250. The depolymerized polymer of the present invention has been found to exhibit the superior properties identified herein when maintained within the indicated polydispersity ratio. If desired for purposes of transportation, storage or otherwise, the depolymerized polymer may be stored in dry form and, when needed, can be rehydrated to form the treating fluid concentrate. The substantially fully hydrated depolymerized polymer is admixed with the water in an amount in excess of about 6% by weight of the concentrate to form the treating fluid concentrate. Preferably, the polymer is present in an amount of from about 6% to in excess of about 30% by weight and most preferably from about 6% to about 20% by weight of the concentrate. The viscosity of the treating fluid concentrate generally may be in the range of from about 15,000 to in excess of about 35,000 cps as determined with a Brookfield DV II+RV spring viscometer manufactured by Brookfield Engineering Laboratories of Middleboro, Mass. The viscosity is determined by measurements performed at a temperature of about 75° F. and a rotational speed of 20 rpm using an LV3 bob. Other similar instruments also can be used to measure the viscosity of the fluid concentrate.

The water utilized to form the treating fluid concentrate can be fresh water, unsaturated salt water or saturated salt water. Generally, the substantially fully hydrated depolymerized polymer utilized in the present invention is mixed with the water in an amount in the range of from about 6% to about 30% by weight of the water.

In some instances it may be desirable to add a dispersing agent to the polymer for dispersing the depolymerized hydratable polymer when it has been stored in a dry form and facilitating its rehydration in water. Any of a variety of dispersing agents known to those individuals of ordinary skill in the art may be utilized. A particularly suitable dispersing agent has been found to be a light hydrocarbon oil such as diesel oil, kerosene, olefins or the like. Another dispersing agent is polyethyleneglycol. Of these, diesel oil is preferred. When an oil dispersing agent is utilized, it is included with the polymer in an amount in the range of from about less than 5% to in excess of about 60% by weight of the polymer.

A variety of other additives can be included in a concentrate of this invention at the time of its manufacture. Such additives generally include pH adjusting compounds for adjusting the pH of the treating fluid to an optimum or desired pH for crosslinking when it is formed with the concentrate. Examples of such compounds which can be utilized include, but are not limited to, formic acid, fumaric acid, acetic acid, acetic anhydride, hydrochloric acid, sodium hydroxide, potassium hydroxide, lithium hydroxide, various carbonates or any other commonly used pH control agent which does not adversely react with the polymer to prevent its use in accordance with the method of the present invention. Of these, sodium hydroxide is preferred. When used, the pH adjusting compound is included in the concentrate in an amount in the range of from about 0.5% to about 10% by weight of the water therein.

A pH buffer also can be included in the concentrate. Examples of buffers which can be used include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. When used, the buffer is included in the concentrate in an amount in the range of from about 0.5% to about 10% by weight of the water therein.

Another additive which can be included in the concentrate is a surfactant for preventing the formation of emulsions between the treating fluid which is formed with the concentrate and subterranean formation fluids. Examples of surfactants which can be used include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. When used, the surfactant is included in the concentrate in an amount in the range of from about 0.01% to about 1% by weight of the water in the treatment fluid. Substantially any other surfactant that is known to be suitable for use in the treatment of subterranean formations and which does not adversely react with the fluid of the present invention may be utilized.

Yet another additive which can be included in the concentrate is a clay stabilizer. Examples of clay stabilizers which can be used include, but are not limited to, potassium chloride, sodium chloride, ammonium chloride and tetramethyl ammonium chloride and the like. Examples of some temporary clay stabilizers that are suitable for use in the present invention are disclosed in for example U.S. Pat. Nos. 5,197,544; 5,097,904; 4,977,962; 4,974,678; 4,828,726, the entire disclosures of which are incorporated herein by reference. Of these, potassium chloride and tetramethyl ammonium chloride are preferred. When used, the clay stabilizer is included in the concentrate in an amount in the range of from about 2% to about 20% by weight of the water therein.

When the concentrate of this invention is mixed with additional water and any other desired additives to form a subterranean treating fluid, no hydration time is required since the concentrate is already substantially fully hydrated. The additional water is mixed with the concentrate in a water to concentrate ratio in the range of from about 4:1 to about 20:1 depending upon the final viscosity desired in the treating fluid. The water utilized can be fresh water, unsaturated salt water including brines or seawater, or saturated salt water.

In order to increase the viscosity of the treating fluid formed with the concentrate, a crosslinking agent is mixed with the water and concentrate. The crosslinked short chain segments of the substantially fully hydrated depolymerized polymer in the concentrate are crosslinked by the crosslinking agent thereby producing a viscous treating fluid having unexpected properties. These unexpected properties include the following: (1) The treating fluid including the extensively depolymerized hydrated and crosslinked polymer segments has unexpected thermal stability at temperatures above about 200° F. and preferably from about 200 to about 275° F. without the use of gel stabilizers. (2) The conventional high molecular weight hydrated polymers utilized in conventional crosslinked treating fluids produce filter cake on the walls of well bores penetrating producing formations and in fractures formed therein which is very difficult to remove. The crosslinked treating fluids of the present invention produce filter cake containing low molecular weight polymer segments which have been discovered to make the filter cake easily removable. (3) As described above, the treating fluids of the present invention do not have to be prehydrated and the treating fluid is mixed with additional water and additives on the surface in a very short time making real time changes in the properties of the treating fluid as it is being pumped possible. (4) The conventional treating fluids formed with crosslinked hydrated polymers produce residue when broken which often damages the treated producing formation. That is, when the heretofore used crosslinked hydrated polymer treating fluids are caused to revert to thin fluids by chemical breakers therein, considerable residue often forms in the broken fluid. This is contrasted with the treating fluids of the present invention which produce very little residue when reduced in viscosity. The treating fluid concentrate utilized in accordance with this invention is processed during its manufacture to remove residue from the concentrate. As a result, the low residue producing treating fluids of this invention produce fractures having higher conductivities than the heretofore used treating fluids. (5) As will be described further hereinbelow, the treating fluids of this invention can, when certain polymers and crosslinkers are employed, include acid reversible crosslink sites. When certain crosslinkers are utilized, the crosslinks are broken simply by lowering the pH to a level below about 9. In this pH range, the treating fluid is not crosslinked and yet the acetal linkages which form the crosslinking sites are stable and can be recrosslinked. This feature allows the treating fluid to be recovered from a treated subterranean formation and well bore and reused rather than having to be disposed of in environmentally sensitive locations. The recovery and reuse of the treating fluids of this invention makes them much more economical to use than conventional prior art fluids.

The improved subterranean formation treating fluids of this invention are basically comprised of water, a substantially fully hydrated depolymerized polymer and a crosslinking agent for crosslinking the hydrated depolymerized polymer. As mentioned above, the water can be selected from fresh water, unsaturated salt water including brines and seawater and saturated salt water.

As indicated above relating to the treating fluid concentrate, the substantially fully hydrated depolymerized polymer in the treating fluid can be a depolymerized polysaccharide and is preferably a substantially fully hydrated depolymerized guar derivative polymer selected from the group consisting of hydroxypropylguar, carboxymethylhydroxypropylguar, carboxymethylguar, hydroxyethylguar and carboxymethylhydroxyethylguar. Of these, substantially fully hydrated depolymerized hydroxypropylguar is most preferred. The substantially fully hydrated depolymerized polymer utilized is generally present in the treating fluid in an amount in the range of from about 0.2% to about 5% by weight of the water therein.

Examples of preferred crosslinking agents which can be utilized in the treating fluid include, but are not limited to, boron compounds such as, for example, boric acid, disodium octaborate tetrahydrate, sodium diborate and pentaborates, ulexite and colemanite, compounds which can supply zirconium IV ions such as, for example, zirconium lactate, zirconium lactate triethanolamine, zirconium carbonate, zirconium acetylacetonate and zirconium diisopropylamine lactate, compounds that can supply titanium IV ions such as, for example, titanium ammonium lactate, titanium triethanolamine, titanium acetylacetonate, aluminum compounds such as aluminum lactate or aluminum citrate or compounds that can supply antimony ions. Of these, a borate compound, is the most preferred. The exact type and amount of crosslinking agent or agents used depends upon the specific depolymerized polymer to be crosslinked, formation temperature conditions and other factors know to those individuals skilled in the art. The crosslinking agent utilized is included in the treating fluid in an amount in the range of from about 50 ppm to about 5000 ppm active crosslinker.

As also mentioned above in connection with the concentrate, a pH adjusting compound for adjusting the pH of the treating fluid to the optimum pH for crosslinking can be included in the treating fluid. The pH adjusting compound can be selected from sodium hydroxide, potassium hydroxide, lithium hydroxide fumaric acid, formic acid, acetic acid, hydrochloric acid, acetic anhydride and the like. Of these, sodium hydroxide is preferred. The pH adjusting compound is included in the treating fluid in an amount in the range of from about 0% to about 0.3% by weight of the water in the treating fluid.

When the preferred crosslinking agent is used, that is, a borate compound, the pH adjusting compound is utilized to elevate the pH of the treating fluid to above about 9. At that pH, the borate compound crosslinking agent crosslinks the short chain hydrated polymer segments. When the pH of the crosslinked treating fluid falls below about 9, the crosslinked sites are no longer crosslinked. Thus, when the crosslinked fracturing fluid of this invention contacts the subterranean formation being treated, the pH is lowered to some degree which begins the breaking process. In order to cause the fracturing fluid to completely revert to a thin fluid in a short period of time, a delayed delinker capable of lowering the pH of the treating fluid can be included in the treating fluid. Examples of delayed delinkers which can be utilized include, but are not limited to, various lactones, esters, encapsulated acids and slowly soluble acid generating compounds, oxidizers which produce acids upon reaction with water, water reactive metals such as aluminum, lithium and magnesium and the like. Of these, the esters are preferred. The delinker is included in the treating fluid in an amount in the range of from about 0% to about 1% by weight of the water therein. Alternatively, any of the conventionally used delayed breakers employed with metal ion crosslinkers can be utilized, for example, oxidizers such as sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase. The specific breaker or delinker utilized, whether or not it is encapsulated, as well as the amount thereof employed will depend upon the breaking time desired, the nature of the polymer and crosslinking agent, formation characteristics and conditions and other factors.

When the subterranean formation treating fluid of this invention is utilized for carrying out a fracture stimulation procedure, proppant material is included in at least a portion of the treating fluid as it is pumped into the subterranean formation to be fractured and into fractures created therein. The proppant material is metered into the treating fluid as the treating fluid is formed and, as mentioned above, the quantity of proppant material per volume of treating fluid can be changed as required in real time. Examples of proppant material which can be utilized include, but are not limited to, resin coated or uncoated sand, sintered bauxite, ceramic materials or glass beads. The proppant material utilized is generally included in the treating fluid in an amount in the range of from about 1 to about 24 pounds of proppant material per gallon of the treating fluid.

As mentioned above in connection with the concentrate, additional components that can be included in the treating fluid of this invention and which can be a part of the treating fluid concentrate used to form the treating fluid include a buffer selected from the group consisting of sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. Of these, sodium carbonate is preferred. The buffer is generally present in the treating fluid in an amount in the range of from about 0% to about 0.3% by weight of water therein.

The treating fluid as well as the concentrate can also include a surfactant for preventing the formation of emulsions between the treating fluid and subterranean formation fluids contacted by the treating fluid. Examples of such surfactants include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde anionic resin blends, cocobetaines, dioctyl sodium sulfosuccinate, imidazolines, alpha olefin sulfonates, linear alkyl ethoxylated alcohols, trialkyl benzylammonium chloride and the like. Of these, dodecylbenzene sulfonic acid salts are preferred. The surfactant is generally present in the treating fluid in an amount in the range of from about 0% to about 0.1% by weight of the water therein.

The treating fluid and the concentrate can also include a clay stabilizer selected, for example, from the group consisting of potassium chloride, sodium chloride, ammonium chloride and tetramethyl ammonium chloride and the like. Of these, potassium chloride and tetramethyl ammonium chloride are preferred. When used, the clay stabilizer is generally present in the treating fluid in an amount in the range of from about 0.5% to about 10% by weight of the water therein.

Other additives can be included in a subterranean formation treating fluid of this invention which are not normally in the treating fluid concentrate used to form the treating fluid. For example, in applications where a fluid loss control agent must be included in the treating fluid, a fluid loss control agent can be metered into the blender during the mixing of the treating fluid. Examples of fluid loss control agents which can be used include, but are not limited to, silica flour, starches, waxes and resins. The fluid loss control agent is included in the treating fluid in an amount in the range of from about 0% to about 1% by weight of water therein.

The subterranean formation treating fluid can also include compounds for retarding the movement of the proppant introduced in the fluid within the created fracture. For example, materials in the form of fibers, flakes, ribbons, beads, shavings, platelets and the like comprised of glass, ceramics, carbon composite, natural or synthetic polymers or metals and the like can be admixed with the fluid and proppant introduced into the subterranean formation to retard or prevent the movement of the introduced proppant. A more detailed description of the forgoing materials is disclosed in, for example, U.S. Pat. Nos. 5,330,005; 5,439,055; and 5,501,275 the entire disclosures of which are incorporated herein by reference. Alternatively, or in addition to the prior materials, a material comprising a tackifying compound may be admixed with the fluid or the proppant to coat at least a portion of the proppant or other solid materials identified above such that the coated material and particulate adjacent thereto will adhere together to form agglomerates which will bridge in the created fracture to prevent particulate flowback. The tackifying compound also may be introduced into the formation with the treatment fluid prior to or after the introduction of the proppant into the formation. The coated material is effective in inhibiting the flowback of fine particulate in the proppant pack having a size ranging from about that of the proppant to less than about 600 mesh. The coated proppant or other material is effective in consolidating fine particulates in the formation in the form of agglomerates to prevent the movement of the fines during production of the formation fluids from the well bore subsequent to the treatment. A more detailed description of the use of the foregoing tackifying compound and the methods of use thereof is disclosed in U.S. Pat. Nos. 5,775,415; 5,787,986; 5,833,000; 5,839,510; 5,871,049; 5,853,048; and 6,047,772 the entire disclosures of which are incorporated herein by reference thereto.

Additional additives that can be included in the treating fluids of this invention which are well known to those skilled in the art include, but are not limited to, scale inhibitors, demulsifiers, clay stabilizers, bactericides, breaker activators and the like.

An improved method of this invention for treating a subterranean formation penetrated by a well bore is comprised of the following steps: (a) preparing a gelled and crosslinked treating fluid comprised of water, a substantially fully hydrated depolymerized polymer and a crosslinking agent for crosslinking said hydrated depolymerized polymer; and (b) contacting said subterranean formation with said gelled crosslinked treating fluid.

Another improved method of the present invention for treating a subterranean formation penetrated by a well bore whereby one or more fractures are formed therein is comprised of the following steps: (a) preparing a gelled and crosslinked fracturing fluid comprised of water, a substantially fully hydrated depolymerized polymer, a crosslinking agent for crosslinking said hydrated depolymerized polymer and a proppant material; and (b) contacting said subterranean formation with said gelled and crosslinked fracturing fluid under conditions effective to create at least one fracture in said subterranean formation.

The water utilized for preparing the gelled and crosslinked fluids called for in the above methods can be fresh water, unsaturated salt water including brines and seawater and saturated salt water. The substantially fully hydrated depolymerized polymer can be a substantially fully hydrated depolymerized polysaccharide and is preferably a substantially fully hydrated depolymerized guar derivative polymer selected from the group consisting of hydroxypropylguar, carboxymethylhydroxypropylguar, carboxymethylguar, hydroxyethyl cellulose, grafted hydroxyethyl cellulose, carboxymethyl cellulose, carboxymethylhydroxyethyl cellulose and the like. Of these, depolymerized hydroxypropylguar is preferred. The substantially fully hydrated depolymerized polymer is included in the treating fluid or fracturing fluid in an amount in the range of from about 0.2% to about 5% by weight of the water therein.

The crosslinking agent utilized in the treating fluid and fracturing fluid is preferably selected from the group consisting of boron compounds such as, for example, boric acid, disodium octaborate tetrahydrate, sodium diborate and pentaborates, compounds which can supply zirconium IV ions such as, for example, zirconium lactate, zirconium lactate triethanolamine, zirconium carbonate, zirconium acetylacetonate and zirconium diisopropylamine lactate, compounds that can supply titanium IV ions such as, for example, titanium ammonium lactate, titanium triethanolamine, titanium acetylacetonate, aluminum compounds such as aluminum lactate or aluminum citrate or compounds that supply antimony ions. Of these, a borate compound is the most preferred. The crosslinking agent utilized is included in the treating fluid in an amount in the range of from about 50 ppm to about 5000 ppm active crosslinker.

The fracturing fluid also includes a proppant material which can be resin coated or uncoated sand, sintered bauxite, ceramic materials, glass beads and the like. The proppant material is included in the fracturing fluid in an amount in the range of from about 1 to about 24 pounds of proppant material per gallon of the treating fluid.

The treating or fracturing fluid can also include a pH adjusting compound for elevating the pH of the fluid. The pH adjusting compound can be selected from sodium hydroxide, potassium hydroxide, lithium hydroxide, formic acid, fumaric acid, acetic acid, acetic anhydride, hydrochloric acid and the like. Of these, sodium hydroxide is preferred. The pH adjusting compound is included in the treating or fracturing fluid in an amount in the range of from about 0% to about 0.3% by weight of the water in the treating fluid.

The treating or fracturing fluid can also include a buffer selected from the group consisting of sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. Of these, sodium carbonate is preferred. The buffer is generally present in the treating or fracturing fluid in an amount in the range of from about 0% to about 0.3% by weight of water therein.

Another component which can be included in the treating fluid or fracturing fluid is a surfactant for preventing the formation of emulsions between the treating or fracturing fluid and subterranean formation fluids. Examples of surfactants which can be used include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. The surfactant is included in the treating or fracturing fluid in an amount in the range of from about 0% to about 0.1% by weight of water therein.

Yet another component which can be included in the treating fluid or fracturing fluid is a clay stabilizer. Examples of clay stabilizers include, but are not limited to, potassium chloride, sodium chloride, ammonium chloride and tetramethyl ammonium chloride and the like. Of these, potassium chloride and tetramethyl ammonium chloride are preferred. When used, the clay stabilizer is included in the concentrate in an amount in the range of from about 0.5% to about 10% by weight of the water therein.

Still another component that can be included in the treating fluid or fracturing fluid is a fluid loss control agent such as, for example, silica flour, starches, waxes and resins. The fluid loss control agent is included in the treating fluid in an amount in the range of from about 0% to about 1% by weight of water therein.

A final component which is usually included in the treating fluid or fracturing fluid is a breaker or crosslink delinker for causing the fluid to quickly revert to a thin fluid. Examples of suitable breakers or delinkers include, but are not limited to, a delayed breaker or delinker capable of lowering the pH of the treating fluid to cause the polymer crosslink to reverse. Examples of delayed breakers or delinkers which can be utilized include, but are not limited to, various lactones, esters, encapsulated acids and slowly soluble acid generating compounds, oxidizers which produce acids upon reaction with water, water reactive metals such as aluminum, lithium and magnesium and the like. Of these, the esters are preferred. Alternatively, any of the conventionally used breakers employed with metal ion crosslinkers can be utilized such as, for example, sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase is preferred. The breaker or delinker is included in the treating or fracturing fluid in an amount in the range of from about 0% to about 1% by weight of water therein.

The subterranean formation treatment fluids of the present invention also may include substantially any of the conventionally known foaming agents which do not adversely react with the fluid constituents such that a gaseous compound such as nitrogen, air, carbon dioxide or another gasifying compound can be admixed with the fluid to form a foam for introduction into the subterranean formation. The gaseous compound can be admixed with the fluid in an amount of from 5% to in excess of 90% to form a foamed treatment fluid for use in stimulating a subterranean formation. When foamed, the fluid of the present invention provides the same benefits as are found in the use of other foamed treatment fluids. The foamed fluid results in less polymer being introduced into the formation, can provide improved fluid loss control and can provide a gas assist in removing the treatment fluid from the well bore at the conclusion of the treatment.

treatment direction flowlines. A high differential pressure of about 200 psi is placed across the core in the treatment direction as the treatment fluid is flowed into the core. The differential pressure is noted in the Table below for each test. The spurt loss fluid volume and all throughput volumes were collected over time intervals sufficient to determine the fluid loss. After the fluid loss phase of the test was completed, the return or regained permeability was measured by injecting 500 ml of API brine through the core in the production direction. No attempt is made to squeeze or chemically remove the filter cake created from the test fluid from the face of the core. The regained permeability then is determined from the flow data gathered. The regained permeability is set forth in Table I below. Each individual fluid which is tested is prepared from the polymers identified in the Table by hydration for a sufficient time to form a fully hydrated polymer and then a crosslinker comprising a borate source is admixed with the fluid in the amount indicated, if present.

TABLE I

Static Fluid Loss And Regained Permeability Tests

| Test Number | Polymer | Polymer Concentration, lbs./1000 gal. | pH | Crosslinker concentration, ppm | Fluid Loss Calc. Spurt | Cw | % Regained Permeability |
|---|---|---|---|---|---|---|---|
| 1 | guar | 41.6 | ND | 0 | 3.3 | 0.019 | 50.6 |
| 2 | guar | 41.6 | 8.4 | 115 | 0.163 | 0.007 | 79.6 |
| 3 | hydroxypropylguar | 41.6 | 8.2 | 315 | 0.662 | 0.012 | 86.9 |
| 4 | hydroxypropylguar | 41.6 | 8.4 | 315 | 0.045 | 0.002 | 89.8 |
| 5 | depolymerized HPG | 41.6 | 9 | 105 | 0.232 | 0.008 | 92.95 |
| 6 | depolymerized HPG | 41.6 | 9 | 315 | 0.048 | 0.007 | 96.3 |

ND: no determination

In order to further illustrate the subterranean formation treating fluid concentrates treating fluids and methods of this invention, the following examples are given.

EXAMPLE 1

The ability of the depolymerized polymer of the present invention to provide static fluid loss control to a treatment fluid introduced into a simulated subterranean formation and regained permeability subsequent to the treatment in comparison to conventional treatment fluids is determined in accordance with the following procedure. A synthetic core material comprising a ceramic having a 5 micron permeability is prepared in lengths of about 3.5 to 4 cm. The cores have a diameter of about 2.37 cm. The cores then are vacuum saturated in filtered API brine. Individual cores then are mounted in a Hassler sleeve device. The flow direction from left-to-right is designated as the production direction and from right-to-left is designated as the treatment direction to simulate the relative directions of movement in treating an actual subterranean formation. A hollow spacer is installed adjacent the core to act as a perforation cavity. Overburden pressure on the Hassler sleeve is administered by maintaining differential pressure from the treating pressure being used. The core is heated to and then maintained throughout the test at a temperature of 125° F. The core then is flushed with 25 ml of filtered API brine in the production direction. Initial permeability to API brine then is determined in the production direction by flow with a differential pressure of 20 psi. Rates are measured every 25 ml of throughput to determine the initial permeability. The fluid to be tested then is introduced into a reservoir in communication with the The foregoing data clearly illustrate that for similar fluid loss, in comparison to conventional treatment fluids, the use of the depolymerized polymer of the present invention results in improved regained formation permeability.

EXAMPLE 2

To evaluate the performance of the various fluids, dynamic fluid loss tests are performed using the depolymerized polymer of the present invention in comparison to conventional treatment fluids in accordance with the following procedure. Core samples are prepared to fit into a modified API linear flow cell. Each sample has a surface area of 10 square inches. Two core wafers are set apart by a 0.30 inch gap to allow fluid to flow through the cell for the dynamic test conditions. The test fluid then is prepared including the addition of any crosslinker. The test fluid is pumped through 340 ft of 0.194 inch diameter steel tubing to provide preconditioning and a shear history to the test fluid. The shear rate on the fluid is about 1800 sec$^{-1}$. The fluid then is introduced into a section of 0.62 inch diameter tubing immersed in a heating bath to simulate the lower shear rate of a fluid in a fracture. The shear rate is about 50 sec$^{-1}$. The fluid is heated to a test temperature of about 180° F. as it goes through the tubing. The test fluid then is introduced into the flow cell where the dynamic fluid loss occurs. A 1000 psi differential pressure force is used to drive the fluid through the cores. The test then is continued for 60 minutes to permit determination of fluid loss coefficients based upon collected fluid volumes. The results are set forth in Table II below. The test fluids comprised for sample 1, a concentration of 129 gallons of treating fluid concentrate of depolymerized polymer and tap water containing 2% KCl per 1000 gallons of fluid which was crosslinked with a borate source at a pH of about 10.1. For sample 2, the fluid comprised guar hydrated in tap water with 2 gallons per 1000 gallons of fluid of a 50% tetramethyl ammonium chloride solution and a breaker comprising 0.25 pounds sodium persulfate and 0.25 pounds encapsulated sodium persulfate per 1000 gallons of fluid which was crosslinked with a borate source at a pH of above about 9.5. For sample 3, the fluid comprised guar hydrated in tap water with 2 gallons per 1000 gallons of fluid of a 50% tetramethyl ammonium chloride solution and a breaker comprising 15 gallons per 1000 gallons of fluid of a sodium chlorite solution and 3 gallons per 1000 gallons of fluid of a copper ethylenediaminetetraacetic acid solution which was crosslinked with a borate source at a pH of above about 9.5

TABLE II

Dynamic Fluid Loss Coefficients With Ohio Sandstone Core Wafers (0.1 to 0.3 md)

| Sample | Polymer | Polymer Concentration % by wt | Breaker | $C_w$ (ft/min$^{0.5}$) | Spurt (gal/ft.$^2$) |
|---|---|---|---|---|---|
| 1 | depolymerized HPG | 1.49 | None | 0.001877 | 0.00294 |
| 2 | guar | 0.3 | persulfate | 0.00287 | 0 |
| 3 | guar | 0.3 | activated sodium chlorite | 0.00357 | 0.0027 |

The results illustrate the present invention provides a treatment fluid with a lower dynamic fluid loss than conventional treatment fluids.

EXAMPLE 3

To determine the fracture conductivity of a proppant pack, the following test was used to simulate production through a proppant pack to determine the conductivity of the fracture. The test cell from each test in Example 2 is opened and the space between the two core wafers is filled with a 20/40 mesh Ottawa sand proppant at a specified lb/ft$^2$ concentration. The test cell then is closed and placed in a press where closure stress can be applied and the reservoir temperature can be simulated by heating the cell to 180° F. The conductivity of the proppant pack then is measured over a period of at least 48 hours until a stable value is obtained by flowing water through the core and proppant pack within the test cell. The results of the tests are set forth in Table III below. The samples are compared to a baseline determination of conductivity determined by placing proppant between the two core wafers with the designated proppant concentration without any fracturing fluid having been passed through the core.

TABLE III

Proppant Pack Conductivity Values

| Sample | Proppant Concentration, lb/ft$^2$ | Closure Stress, psi | Conductivity, md-ft | Percentage of Baseline, % |
|---|---|---|---|---|
| 1 | 2 | 2000 | 2744 | 65 |
|   |   | 4000 | 1705 | 74 |
|   |   | 6000 | 540 | 62 |
| 2 | 2 | 2000 | 674 | 16 |
|   |   | 4000 | 390 | 17 |
|   |   | 6000 | 209 | 24 |

TABLE III-continued

Proppant Pack Conductivity Values

| Sample | Proppant Concentration, lb/ft$^2$ | Closure Stress, psi | Conductivity, md-ft | Percentage of Baseline, % |
|---|---|---|---|---|
| 3 | 2 | 2000 | 2526 | 60 |
|   |   | 4000 | 1011 | 44 |
|   |   | 6000 | 488 | 56 |

The results illustrate the treatment fluid of the present invention achieves superior proppant pack conductivity in comparison to conventional treatment fluids without the necessity of the use of any breaker in the treatment fluid.

EXAMPLE 4

To evaluate the performance of the treatment fluid of the present invention in an actual field job, two wells were treated in accordance with the methods of the present invention. The wells in the Cottage Grove formation each had a depth of about 8000 ft and a bottom hole temperature of about 155° F. One treatment was performed with an added breaker in the treatment fluid and the other treatment was performed without any additional breaker. In the first job, 125 barrels of treatment fluid concentrate were prepared with a depolymerized hydroxypropylguar which was utilized to prepare 3000 gallons of linear gel that was used to perform a minifrac treatment on the well and 30,000 gallons of crosslinked fluid which was used to perform the principal treatment and place the proppant. The fluid included sodium hydroxide in an amount sufficient to raise the fluid pH to about 12.1 and a borate crosslinker for crosslinking the depolymerized polymer. The proppant was ramped from a concentration of from about 1 to about 5 lbs per gallon for a total injected quantity of 50,000 pounds. A conventional breaker comprising encapsulated ammonium persulfate was admixed with the crosslinked gelled fluid in an amount of from about 2 to about 4 lbs per 1000 gallons of fluid. The treatment was performed at an average rate of about 13 bpm and successfully placed the entire quantity of proppant.

Production of oil during the two months following the treatment exceeded per-treatment production by in excess of 200%.

The second job utilized the same depolymerized polymer. Approximately 110 barrels of treatment fluid concentrate were used to prepare 30,000 gallons of crosslinked fluid that is used to perform a fracturing treatment upon the well. The fluid includes sodium hydroxide in an amount sufficient to adjust the pH to a level of about 12.1 and a borate crosslinker for crosslinking the depolymerized polymer. The proppant introduced with the fluid was ramped in concentration from about 1 to about 5 lbs per gallon of fluid. The fluid did not include any breaker.

Production of oil during the two months after the treatment exceeded pre-treatment production by in excess of 100%.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of treating a subterranean formation penetrated by a well bore comprising the steps of:
   (a) preparing a gelled and crosslinked treating fluid by mixing water, a substantially fully hydrated depolymerized polymer and a crosslinking agent for crosslinking said substantially hydrated depolymerized polymer; and
   (b) contacting said subterranean formation with said gelled and crosslinked treating fluid.

2. The method of claim 1 wherein said water is selected from the group consisting of fresh water, unsaturated salt water and saturated salt water.

3. The method of claim 1 wherein said substantially fully hydrated depolymerized polymer is a substantially fully hydrated depolymerized guar derivative polymer selected from the group consisting of hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

4. The method of claim 1 wherein said substantially fully hydrated depolymerized polymer is substantially fully hydrated depolymerized hydroxypropylguar.

5. The method of claim 1 wherein said substantially fully hydrated depolymerized polymer is present in said treating fluid in an amount in the range of from about 0.2% to about 5% by weight of said water therein.

6. The method of claim 1 wherein said crosslinking agent is selected from the group consisting of boron compounds, compounds that supply zirconium IV ions, compounds that supply titanium IV ions, aluminum compounds and compounds that supply antimony ions.

7. The method of claim 1 wherein said crosslinking agent is a boron compound.

8. The method of claim 1 wherein said crosslinking agent is present in said treating fluid in an amount in the range of from about 50 ppm to about 5000 ppm.

9. The method of claim 1 wherein said treating fluid further comprises a pH adjusting compound for elevating the pH of the treating fluid selected from the group consisting of sodium hydroxide, potassium hydroxide and lithium hydroxide.

10. The method of claim 9 wherein said pH adjusting compound is sodium hydroxide.

11. The method of claim 9 wherein said pH adjusting compound is present in said treating fluid in the range of from about 0% to about 0.3% by weight of said water therein.

12. The method of claim 1 wherein said treating fluid further comprises a buffer selected from the group consisting of sodium carbonate, potassium carbonate, sodium bicarbonate, potassium bicarbonate, sodium diacetate, potassium diacetate, sodium phosphate, potassium phosphate, sodium dihydrogen phosphate and potassium dihydrogen phosphate.

13. The method of claim 12 wherein said buffer is sodium carbonate.

14. The method of claim 12 wherein said buffer is present in said treating fluid in an amount in the range of from about 0% to about 0.3% by weight of said water therein.

15. The method of claim 1 wherein said treating fluid further comprises a surfactant for preventing the formation of emulsions between said treating fluid and subterranean formation fluids selected from the group consisting of alkyl sulfonates, alkyl aryl sulfonates such as the salts of dodecylbenzene sulfonic acid, alkyltrimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols and trialkyl benzylammonium chloride.

16. The method of claim 15 wherein said surfactant is a salt of dodecylbenzene sulfonic acid.

17. The method of claim 15 wherein said surfactant is present in said treating fluid in an amount in the range of from about 0% to about 0.1% by weight of said water therein.

18. The method of claim 1 wherein said treating fluid further comprises a clay stabilizer selected from the group consisting of potassium chloride, sodium chloride, ammonium chloride, tetramethyl ammonium chloride and temporary clay stabilizers.

19. The method of claim 18 wherein said clay stabilizer is potassium chloride.

20. The method of claim 12 wherein said clay stabilizer is present in said treating fluid in an amount in the range of from about 0.5% to about 10% by weight of said water therein.

21. The method of claim 1 wherein said treating fluid further comprises a fluid loss control agent selected from the group consisting of silica flour, starches, waxes and resins.

22. The method of claim 21 wherein said fluid loss control agent is present in said treating fluid in an amount in the range of from about 0% to about 1% by weight of said water therein.

23. The method of claim 1 which further comprises a delayed delinker for causing said treating fluid to revert to a thin fluid selected from the group consisting of lactone delinkers, ester delinkers, encapsulated acid delinkers, slowly soluble acid generating delinkers, oxidizers that produce acids upon reaction with water and water reactive metals.

24. The method of claim 23 wherein said delayed delinker is present in said treating fluid in an amount in the range of from about 0% to about 1% by weight of said water therein.

25. The method of claim 1 wherein said treating fluid further comprises a delayed breaker for causing said treating fluid to revert to a thin fluid selected from the group of oxidizers, encapsulated oxidizers and enzyme breakers consisting of sodium persulfate, potassium persulfate, ammonium persulfate, magnesium peroxide, sodium chlorite, sodium bromate, alpha and beta amylases, amyloglucosidase, invertase, maltase, cellulose and hemicellulase.

26. The method of claim 1 wherein said breaker is present in said treating fluid in an amount sufficient to break said treating fluid and cause it to revert to a thin fluid.

27. An improved method of treating a subterranean formation penetrated by a well bore whereby one or more fractures are formed therein comprising the steps of:
   (a) preparing a gelled and crosslinked fracturing fluid by mixing water, a substantially fully hydrated depolymerized polymer, and crosslinking agent for crosslinking said substantially fully hydrated depolymerized polymer;

(b) contacting said subterranean formation with said gelled and crosslinked fracturing fluid under conditions effective to create at least one fracture in said subterranean formation; and (c) mixing a proppant material with at least a portion of said crosslinked fracturing fluid.

28. The method of claim 27 wherein said depolymerized polymer has a polydispersity ratio of from 1 to about 12.

29. The method of claim 27 wherein said substantially fully hydrated depolymerized polymer is a substantially fully hydrated depolymerized guar derivative polymer selected from the group consisting of hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

30. The method of claim 27 wherein said substantially fully hydrated depolymerized polymer is substantially fully hydrated depolymerized hydroxypropylguar.

31. The method of claim 27 wherein said substantially fully hydrated extensively depolymerized polymer is present in said treating fluid in an amount in the range of from about 0.2% to about 5% by weight of said water therein.

32. The method of claim 27 wherein said crosslinking agent is selected from the group consisting of boron compounds and compounds that can supply zirconium IV ions, titanium IV ions, aluminum ions or antimony ions.

33. The method of claim 27 wherein said crosslinking agent is a boron compound.

34. The method of claim 27 wherein said crosslinking agent is present in said fracturing fluid in an amount in the range of from about 50 ppm to 5000 ppm.

35. The method of claim 27 wherein said proppant material is selected from the group consisting of resin coated or uncoated sand, sintered bauxite, ceramic materials and glass beads.

36. The method of claim 27 wherein said proppant material is present in said treating fluid in an amount in the range of from about 1 to about 24 pounds of proppant material per gallon of said treating fluid.

37. The method of claim 27 wherein said treating fluid further comprises a pH adjusting compound for elevating the pH of the treating fluid selected from the group consisting of sodium hydroxide, potassium hydroxide and lithium hydroxide.

38. The method of claim 27 wherein said pH adjusting compound is sodium hydroxide.

39. The method of claim 27 wherein said pH adjusting compound is present in said treating fluid in an amount in the range of from about 0% to about 0.3% by weight of said water therein.

40. The method of claim 27 wherein said treating fluid further comprises a buffer selected from the group consisting of sodium carbonate, potassium carbonate, sodium bicarbonate, potassium bicarbonate, sodium diacetate, potassium diacetate, sodium phosphate, potassium phosphate, sodium dihydrogen phosphate and potassium dihydrogen phosphate.

41. The method of claim 40 wherein said buffer is sodium carbonate.

42. The method of claim 40 wherein said buffer is present in said treating fluid in an amount in the range of from about 0% to about 0.3% by weight of said water therein.

43. The method of claim 27 wherein said treating fluid further comprises a surfactant for preventing the formation of emulsions between said treating fluid and subterranean formation fluids selected from the group consisting of alkyl sulfonates, alkyl aryl sulfonates such as the salts of dodecylbenzene sulfonic acid, alkyltrimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols and trialkyl benzylammonium chloride.

44. The method of claim 43 wherein said surfactant is a salt of dodecylbenzene sulfonic acid.

45. The method of claim 43 wherein said surfactant is present in said treating fluid in an amount in the range of from about 0% to about 0.01% by weight of said water therein.

46. The method of claim 27 wherein said treating fluid further comprises a clay stabilizer selected from the group consisting of potassium chloride, sodium chloride, ammonium chloride, tetramethyl ammonium chloride and temporary clay stabilizers.

47. The method of claim 46 wherein said clay stabilizer is potassium chloride.

48. The method of claim 47 wherein said clay stabilizer is present in said treating fluid in an amount in the range of from about 0.5% to about 10% by weight of said water therein.

49. The method of claim 27 wherein said treating fluid further comprises a fluid loss control agent selected from the group consisting of silica flour, starches, waxes and resins.

50. The method of claim 49 wherein said fluid loss control agent is present in said treating fluid in an amount in the range of from about 0% to about 1% by weight of said water therein.

51. The method of claim 27 wherein said treating fluid further comprises a delayed delinker for causing said treating fluid to revert to a thin fluid selected from the group consisting of lactone delinkers, ester delinkers, encapsulated acid delinkers, slowly soluble acid generating delinkers, oxidizers that produce acid upon reaction with water and water reactive metals.

52. The method of claim 51 wherein said delayed delinker is present in said treating fluid in an amount in the range of from about 0% to about 1% by weight of said water therein.

53. The method of claim 27 wherein said treating fluid further comprises a delayed breaker for causing said treating fluid to revert to a thin fluid selected from the group consisting of oxidizers, encapsulated oxidizers and enzyme breakers consisting of sodium persulfate, potassium persulfate, ammonium persulfate, magnesium peroxide, sodium chlorite, sodium bromate, alpha and beta amylases, amyloglucosidase, invertase, maltase, cellulose and hemicellulase.

54. The method of claim 53 wherein said breaker is present in said treating fluid in an amount in the range of from about 0% to about 1% by weight of said water therein.

* * * * *